United States Patent
Molnar et al.

(10) Patent No.: US 10,030,540 B2
(45) Date of Patent: Jul. 24, 2018

(54) FAN CASE LINER REMOVAL WITH EXTERNAL HEAT MAT

(71) Applicants: Rolls-Royce North American Technologies, Inc., Indianapolis, IN (US); Rolls-Royce Corporation, Indianapolis, IN (US); Rolls-Royce plc, Derby (GB)

(72) Inventors: Daniel E. Molnar, Lebanon, IN (US); Eric W. Engebretsen, Zionsville, IN (US); Michael Buckley, Shardlow (GB); Ewan F. Thompson, Repon (GB)

(73) Assignees: Rolls-Royce North American Technologies Inc., Indianapolis, IN (US); Rolls-Royce Corporation, Indianapolis, IN (US); Rolls-Royce plc (GB)

( * ) Notice: Subject to any disclaimer, the term of this patent is extended or adjusted under 35 U.S.C. 154(b) by 339 days.

(21) Appl. No.: 14/949,247

(22) Filed: Nov. 23, 2015

(65) Prior Publication Data
US 2016/0146050 A1    May 26, 2016

Related U.S. Application Data

(60) Provisional application No. 62/084,341, filed on Nov. 25, 2014.

(51) Int. Cl.
| F01D 25/24 | (2006.01) |
| B29C 63/00 | (2006.01) |
| F04D 29/64 | (2006.01) |
| F04D 29/52 | (2006.01) |

(52) U.S. Cl.
CPC .......... *F01D 25/24* (2013.01); *B29C 63/0013* (2013.01); *F04D 29/644* (2013.01); *F04D 29/526* (2013.01)

(58) Field of Classification Search
CPC ...... F01D 25/24; F04D 29/644; F04D 29/526; B29C 63/0013
See application file for complete search history.

(56) References Cited

U.S. PATENT DOCUMENTS

| 3,996,091 A | * | 12/1976 | Daunt | ............... B29C 33/02 156/285 |
| 5,030,816 A | | 7/1991 | Strecker et al. | |
| 5,114,100 A | * | 5/1992 | Rudolph | ............... B64C 21/06 244/130 |

(Continued)

FOREIGN PATENT DOCUMENTS

| EP | 1860283 A2 | 11/2007 |
| EP | 2305984 A2 | 4/2011 |

(Continued)

OTHER PUBLICATIONS

Extended European Search Report for European Application No. 15195926.9-1706, dated Mar. 23, 2016, 5 pages.

*Primary Examiner* — Eldon Brockman
(74) *Attorney, Agent, or Firm* — Barnes & Thornburg LLP

(57) ABSTRACT

A method of replacing a fan case liner panel in an engine fan case is provided. In one illustrative form, the method may include applying heat to an engine fan case to debond an adhesive layer, removing the first fan case liner panel, and bonding a second fan case liner panel.

20 Claims, 4 Drawing Sheets

(56) References Cited

U.S. PATENT DOCUMENTS

| | | | | |
|---|---|---|---|---|
| 5,344,280 | A | * | 9/1994 | Langenbrunner ..... F01D 21/045 415/119 |
| 5,662,757 | A | * | 9/1997 | Langenbrunner ....... F01D 11/12 156/298 |
| 5,683,789 | A | * | 11/1997 | Langenbrunner ....... F01D 11/12 252/511 |
| 6,558,493 | B1 | | 5/2003 | Ledger et al. |
| 6,716,297 | B2 | | 4/2004 | Essig et al. |
| 6,835,262 | B1 | * | 12/2004 | Reis ......................... B64C 1/40 100/211 |
| 7,507,312 | B2 | | 3/2009 | Bossi et al. |
| 7,823,374 | B2 | * | 11/2010 | Venkataramani ....... F02C 7/047 60/226.1 |
| 7,901,532 | B2 | | 3/2011 | Bain et al. |
| 7,935,205 | B2 | | 5/2011 | Bogue et al. |
| 7,980,813 | B2 | | 7/2011 | Medynski et al. |
| 8,021,102 | B2 | * | 9/2011 | Xie ...................... B29C 70/086 29/889.2 |
| 9,309,781 | B2 | * | 4/2016 | Roby ...................... F01D 25/02 |
| 2011/0211943 | A1 | * | 9/2011 | Belbeck ................. F01D 11/12 415/182.1 |
| 2012/0125523 | A1 | | 5/2012 | Dupre |
| 2013/0064658 | A1 | | 3/2013 | Rookstool |
| 2014/0150262 | A1 | * | 6/2014 | Le Borgne ............ B29C 70/088 29/889.3 |

FOREIGN PATENT DOCUMENTS

| | | | |
|---|---|---|---|
| GB | 2382380 | A | 5/2003 |
| GB | 2407343 | A | 4/2005 |

\* cited by examiner

FAN CASE LINER REMOVAL WITH EXTERNAL HEAT MAT

CROSS REFERENCE TO RELATED APPLICATIONS

This application claims priority to and the benefit of U.S. Provisional Patent Application No. 62/084,341, filed 25 Nov. 2014, the disclosure of which is now expressly incorporated herein by reference.

FIELD OF THE DISCLOSURE

The present disclosure is related to repairing a fan case liner in a gas turbine engine, and particularly to a method of replacing a fan case liner panel.

BACKGROUND

Gas turbine engines used in aircraft often include a fan assembly that is driven by an engine core to push air through the engine and provide thrust for the aircraft. A typical fan assembly includes a fan rotor having blades and a fan case that extends around the blades of the fan rotor. During operation, the fan blades of the fan rotor are rotated to push air through the engine. The fan case both guides the air pushed by the fan blades and provides a protective band that blocks fan blades from being thrown out of the fan assembly in case of a blade-off event in which a fan blade is released from the fan rotor.

Fan cases may optionally include sound attenuation devices (sometimes called dampers), and composite reinforcements (sometimes called fan case liners or fan track liners). Composite reinforcements, or fan case liners, are generally used to strengthen the fan cases and may be coupled to the metallic shrouds with adhesives.

SUMMARY

The present disclosure may comprise one or more of the following features and combinations thereof.

According to an aspect of the present disclosure, a method of replacing a fan case liner in a fan case may include applying heat to a portion of an exterior surface of a fan case to soften an adhesive layer bonding a first fan case liner panel to an inner surface of the fan case, removing the first fan case liner panel and adhesive residue from the fan case to produce an undisrupted inner surface of the fan case, and bonding a second fan case liner panel to the undisrupted inner surface of the fan case. The step of applying heat to the portion of the exterior of the fan case is performed on the portion of the fan case containing the first fan case liner panel.

In some embodiments, applying heat to the portion of the exterior of the fan case includes arranging a heating element along the exterior surface of the fan case and providing electricity to the heating element to heat the adhesive layer to a debonding temperature. In another embodiment, the heating element comprises a flexible silicon heating mat. In another embodiment, the portion of the exterior surface of the fan case overlies the first fan case liner panel. In yet another embodiment, the debonding temperature is about 150° C. to about 160° C. In some embodiments, the fan case is held at the debonding temperature for about five minutes to about one hour.

In some embodiments, removing the first fan case liner panel includes prying the first fan case liner panel from the fan case. In another embodiment, removing the adhesive residue includes applying a solvent and manually removing the adhesive residue. Illustratively, manually removing the adhesive residue from the inner surface of the fan case can be performed with a scraper.

In some embodiments, bonding the second fan case liner panel includes applying an unbonded adhesive layer to the undisrupted inner surface of the fan case and bonding the second fan case liner panel to the unbonded adhesive layer and the undisrupted inner surface. In an embodiment, heating the exterior surface of the fan case can bond the second fan case liner panel to the fan case.

In some embodiments, a method further includes removing edge and fastener fillers prior to applying heat to the exterior surface of the fan case.

In some embodiments, the fan case liner panel includes a bonding layer, a surface layer, and a core layer arranged to extend between and interconnect the bonding layer and the surface layer. In an embodiment, the adhesive layer is located between the bonding layer of the fan case liner panel and the inner surface of the fan case. In an embodiment, the adhesive layer comprises a polysulphide adhesive. In an alternative embodiment, the adhesive layer comprises a polythioether adhesive.

In some embodiments, the fan case includes a plurality of fan case liner panels arranged in a ring along the inner surface of the fan case to circumferentially surround a fan included in a gas turbine engine.

According to another aspect of the present disclosure, a method of replacing a fan case liner in a fan case may include applying heat to an exterior surface of a fan case to soften an adhesive bonding a first fan case liner panel to an inner surface of the fan case, removing the first fan case liner panel and adhesive residue from the fan case to produce an undisrupted surface of the fan case, and bonding a second fan case liner panel to the undisrupted surface of the fan case. In some embodiments, applying heat to the exterior of the fan case is performed on a portion of the fan case containing the first fan case liner panel, the first fan case liner panel includes a bonding layer, a surface layer, a core layer arranged to extend between and interconnect the bonding layer and the surface layer, and an adhesive layer located between the bonding layer of the first fan case liner panel and the inner surface of the fan case.

According to another aspect of the present disclosure, a replaceable fan case liner system for a gas turbine engine may include a ring-shaped fan case, a heat source, and a fan case liner system. The ring-shaped fan case can be arranged to surround circumferentially a fan. The heat source can be arranged to extend along the exterior surface of the ring-shaped fan case. The fan case liner system can be configured to extend around an inner surface of the ring-shaped fan case between the fan and the ring-shaped fan case.

In some embodiments, the fan case liner system includes a fan case liner panel coupled to the ring-shaped fan case that forms a continuous ring on the inner surface of the ring-shaped fan case and the fan case liner panel is configured to bond to the inner surface of the ring-shaped fan case.

In some embodiments, the fan case liner system further includes an adhesive layer located between the fan case liner panel and the inner surface of the ring-shaped fan case.

These and other features of the present disclosure will become more apparent from the following description of the illustrative embodiments.

BRIEF DESCRIPTION OF THE DRAWINGS

FIG. 5A shows a first fan case liner panel;

FIG. 5B shows the removal of a first fan case liner panel;

FIG. 5C shows a second fan case liner panel positioned to be added to the location vacated by the first section of the fan case liner;

FIG. 5D shows a repaired fan case liner with the second fan case liner panel in the section where the first fan case liner panel was previously located.

DETAILED DESCRIPTION OF THE DRAWINGS

Figure 1:
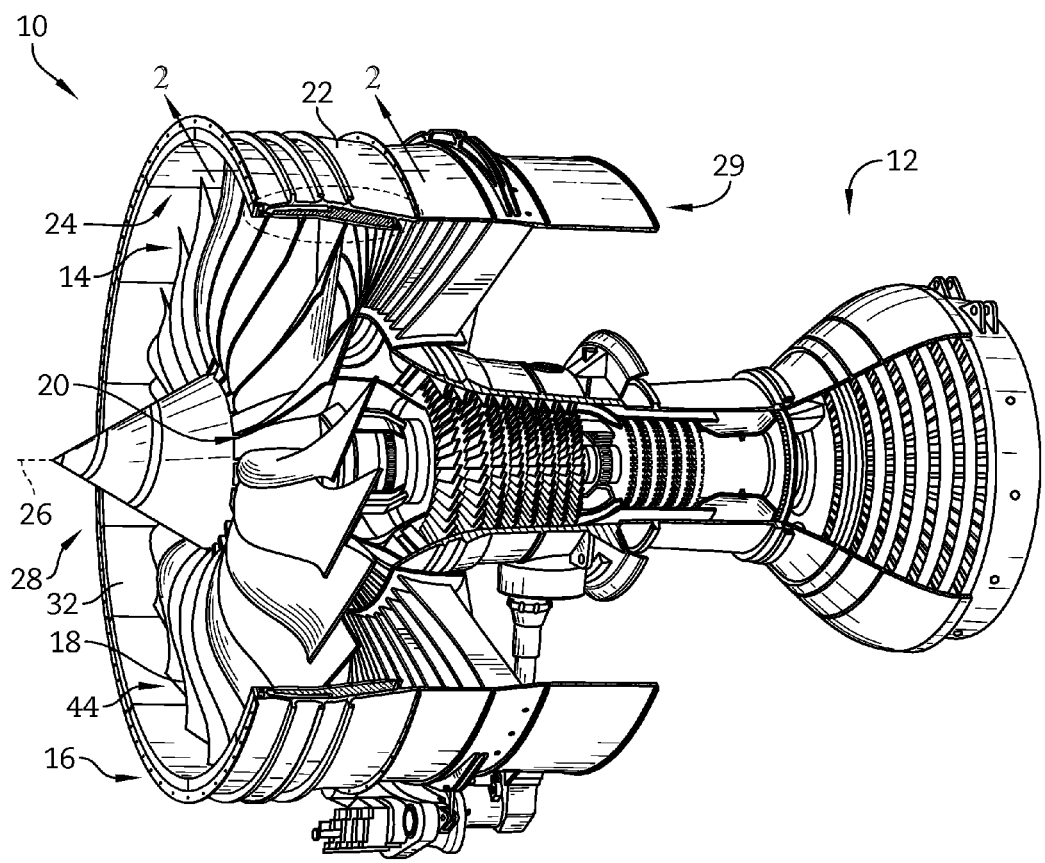
FIG. 1 is a cutaway view of a gas turbine engine including a fan case showing that the fan case surrounds fan blades included in a fan assembly and showing that the fan case includes an annular outer shroud and a fan case liner formed by a number of segments positioned between the fan blades and the annular outer shroud.

For the purposes of promoting an understanding of the principles of the disclosure, reference will now be made to a number of illustrative embodiments illustrated in the drawings and specific language will be used to describe the same.

A gas turbine engine 10 in accordance with the present disclosure is shown in FIG. 1. The gas turbine engine 10 includes an engine core 12, a fan assembly 14, and a fan case 16. The fan case 16 is arranged to surround the fan blades 18 of the fan assembly 14 to minimize escape of a fan blade 18 in the event of that a fan blade 18 is thrown off of a fan rotor 20 during the operation of the gas turbine engine 10.

The fan case 16 includes an annular outer shroud 22 and a fan case liner 24 as shown in FIGS. 1-5A-D. The fan case 16 is ring shaped and surrounds a central axis 26 to locate the fan assembly 14 between a front end 28 of the fan case 16 and a rear end 29 of the fan case 16. The fan case liner 24 is arranged along an inner radial surface 30 of the annular outer shroud 22 and is configured to reinforce the annular outer shroud 22. The fan case liner 24 can circumferentially distribute forces during a blade-off event around the annular outer shroud 22 to prevent escape of the fan blade 18 from the fan case 16.

Figure 2:
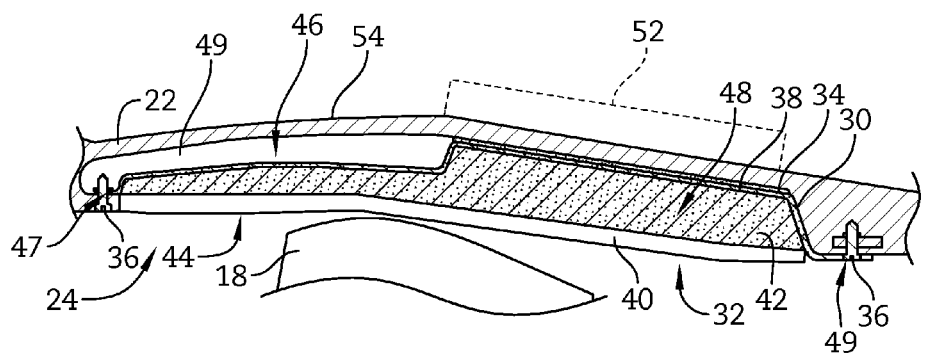
FIG. 2 is a cross-sectional view of a portion of the fan case showing a fan case liner panel coupled to the fan case.
Figure 3:
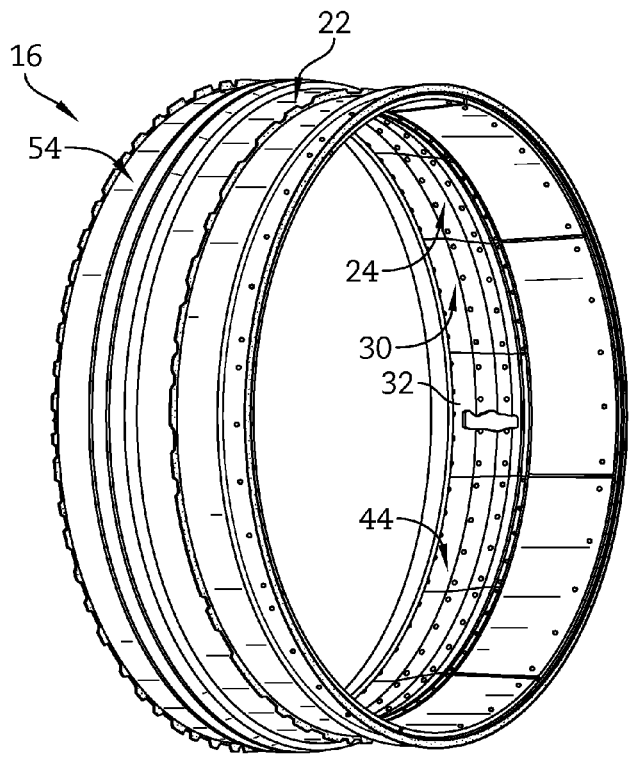
FIG. 3 is a perspective view of a fan case showing a first section of the fan case liner.
Figure 4:
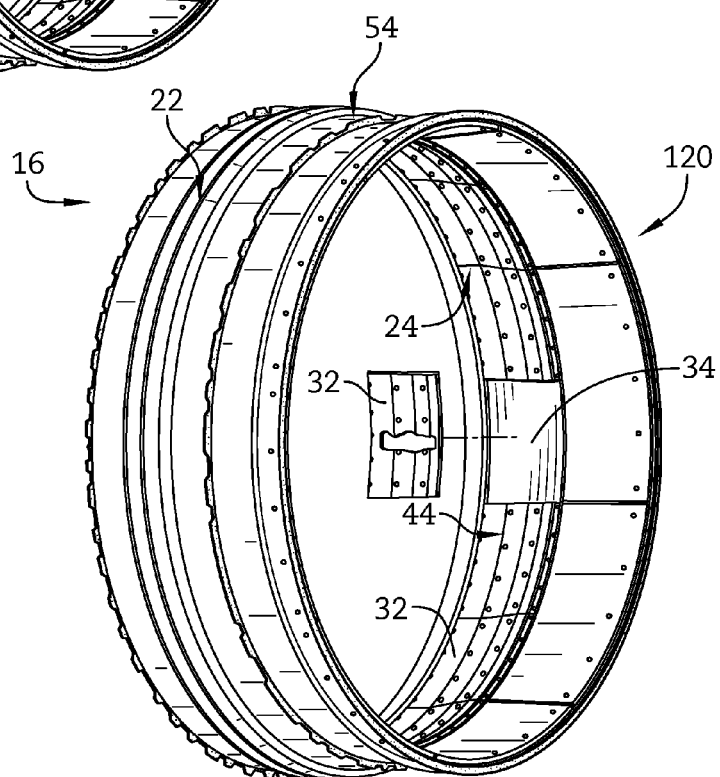
FIG. 4 is a perspective view of a fan case showing that a first section of the fan case liner can be removed.

The fan case liner 24 includes a plurality of fan case liner panels 32, an adhesive layer 34, and optionally fasteners 36, as shown in FIG. 2. The fan case liner panels 32 are arranged to form a continuous ring along the inner radial surface 30 of the annular outer shroud 22, as shown in FIGS. 1, 3, and 4. The adhesive layer 34 is arranged to extend between and interconnect the fan case liner panel 32 and the inner radial surface 30. The fasteners 36 cooperate with the adhesive layer 34 to couple the fan case liner panel 32 to the fan case 16.

A fan case liner panel 32, sometimes called a fan track liner, may become deficient during the use of the gas turbine engine 10 and require replacement, as shown in FIG. 3. Illustratively, a first fan case liner panel 32 of the fan case liner 24 can be removed without removing other fan case liner panels 32, as shown in FIG. 4. After removing the first fan case liner panel 32, a second fan case liner panel 32 can be installed.

Figure 5A:
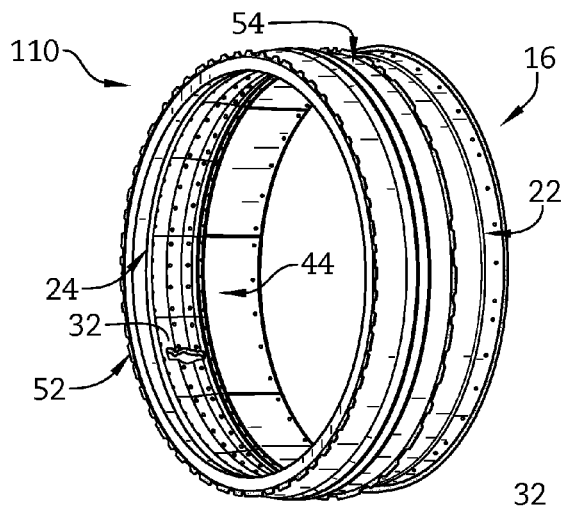
FIGS. 5A-D are a series of perspective views showing some of the steps for replacing a first fan case liner panel of the fan case liner.
Figure 5B:
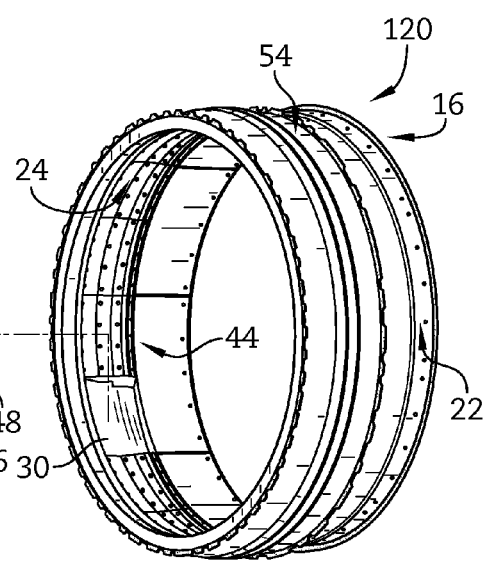
Figure 5C:
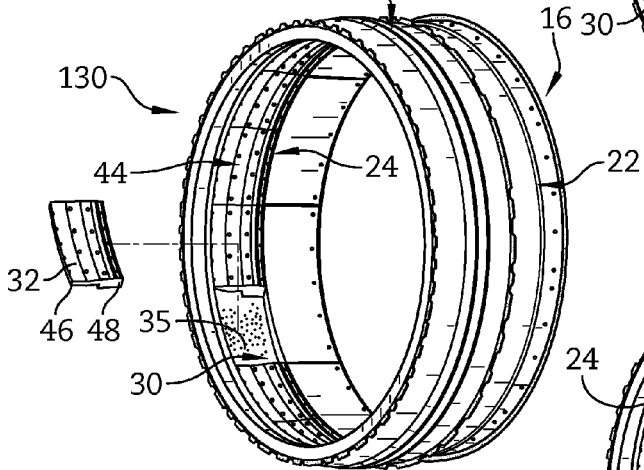
Figure 5D:
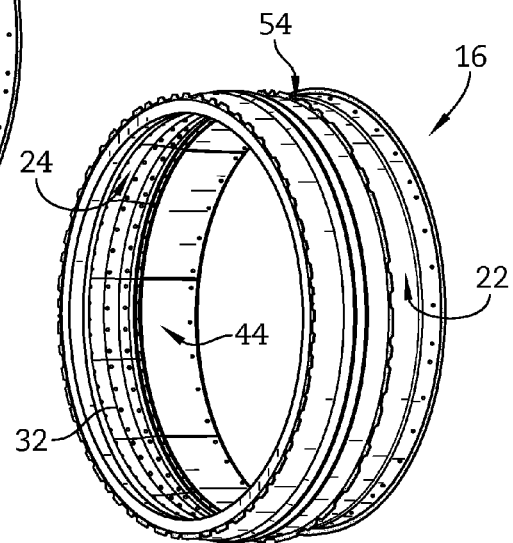
Figure 6:
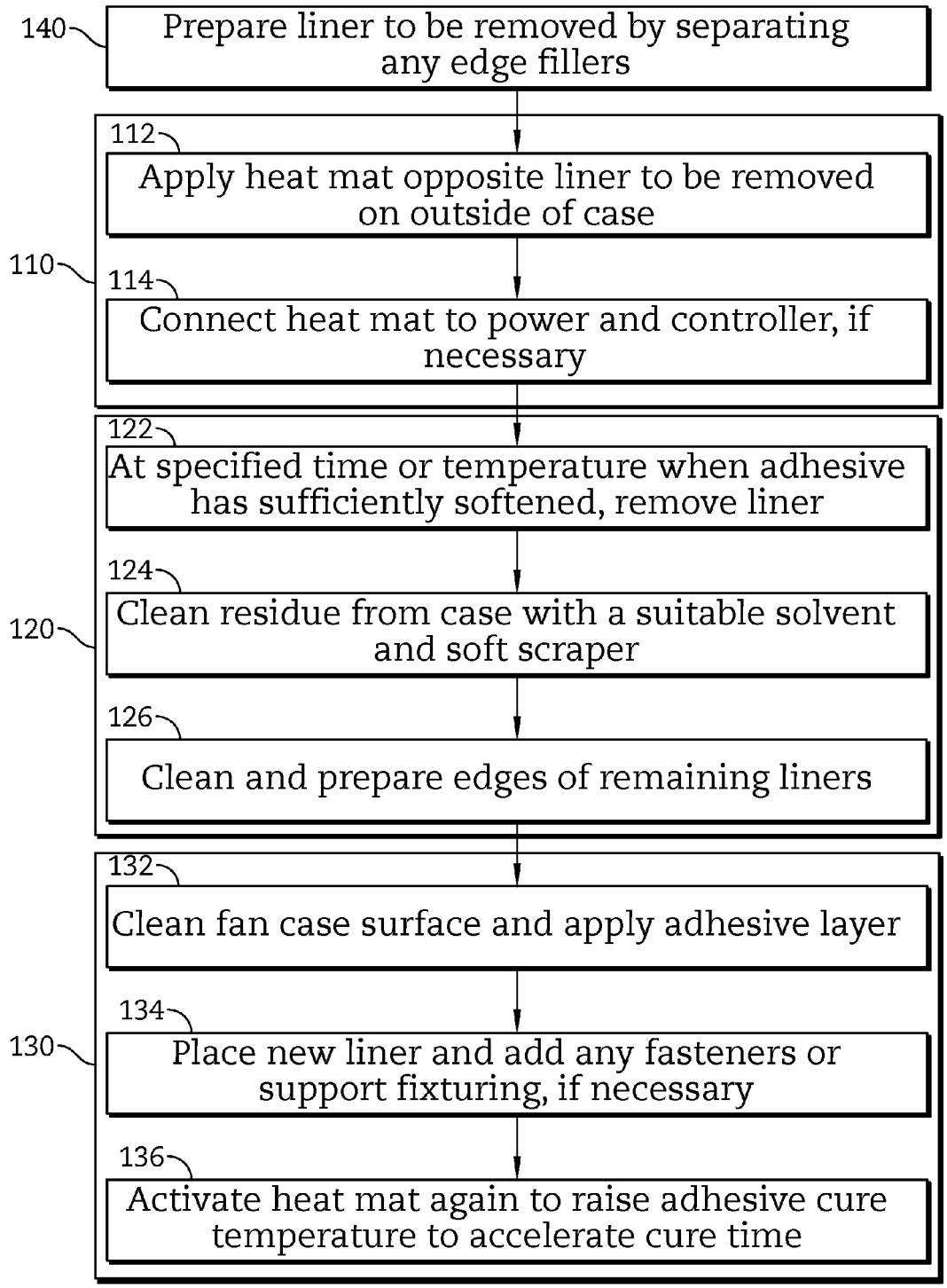
FIG. 6 is a diagrammatic chart of a fan case liner panel replacement method in accordance with the present disclosure.

A method 100 for repairing the fan case liner 24 is shown in FIGS. 5A-D and 6. Individual fan case liner panels 32 can be replaced by following method 100 without damaging the fan case 16, as shown in FIGS. 3 and 4. The method 100 of repairing the fan case liner 24 can include the step 110 of applying heat to the portion of the outer radial surface 54 of the fan case 16 that overlies the fan case liner panel 32 that will be removed, as shown in FIG. 5A, the step 120 of removing the first fan case liner panel 32 from the inner radial surface 30 of the fan case 16, as shown in FIG. 5B, and the step 130 of bonding a second fan case liner panel 32 to the inner radial surface 30, as shown in FIGS. 5C and 6.

The fan case liner panel 32 includes a bonding layer 38, a surface layer 40, and a core layer 42, as shown in FIG. 2. The bonding layer 38 is located between the core layer 42 and the inner radial surface 30 of the fan case 16. The surface layer 40 is coupled to the core layer 42 and is arranged to form an outer surface 44 of the fan case liner 24. The core layer 42 is arranged to extend between and interconnect the bonding layer 38 and the surface layer 40.

Illustratively, the surface layer 40 of the fan case liner panel 32 provides the outer surface 44, as shown in FIGS. 1 and 2. In an embodiment, the surface layer 40 comprises a composite material. In another embodiment, the surface layer 40 is aramid polymer.

The core layer 42 is located between the bonding layer 38 and the surface layer 40. In an embodiment, the core layer 42 comprises a honeycomb material. In another embodiment, the core layer 42 comprises an aluminum honeycomb material.

The bonding layer 38 is located between the core layer 42 and the inner radial surface 30 of the fan case 16, as shown in FIG. 2. In an embodiment, the bonding layer 38 comprises a glass fiber material. In another embodiment, the bonding layer 38 comprises a carbon fiber material.

The fan case liner panel 32 can be coupled to the inner radial surface 30 of the annular outer shroud 22 with an adhesive layer 34. The adhesive layer 34 is located between the bonding layer 38 and the inner radial surface 30. In an embodiment, the adhesive layer 34 comprises a polysulphide adhesive. In another embodiment, the adhesive layer 34 comprises a polythioether adhesive. While polysulphide and polythioether adhesives are described, it should be understood that adhesive layer 34 may comprise any suitable adhesive.

The bonding strength of the adhesive can be weakened by heating to a debonding temperature. The debonding temperature is chosen so no damage occurs to the neighboring fan case liner panels 32 or to the fan case 16. The debonding temperature may be one of the following values: about 100° C., about 110° C., about 120° C., about 130° C., about 140° C., about 145° C., about 150° C., about 155° C., about 160° C., about 165° C., about 170° C., about 180° C., about 190° C., and about 200° C. In an embodiment, the debonding temperature range can be selected from the following ranges, about 100° C. to about 200° C., about 120° C. to about 200° C., about 130° C. to about 200° C., about 130° C. to about 180° C., about 130° C. to about 170° C., about 140° C. to about 160° C., and about 150° C. to about 160° C. In an embodiment, the debonding temperature of the adhesive layer 34 is 150° C.

The bonding strength of the adhesive can be weakened by heating to a debonding temperature for the duration of a debonding time. The debonding time is chosen so no damage occurs to the neighboring fan case liner panels 32 or to the fan case 16. The duration of the debonding time can depend on the debonding temperature. Also, the duration of the debonding time can depend on the thickness of fan case 16. For example, if a fan case 16 is relatively thin, the debonding time will be shorter than if fan case 16 is relatively thick. The debonding temperature may be one of the following values: about 1 minute, about 2 minutes, about 3 minutes, about 4 minutes, about 5 minutes, about 10 minutes, about 15 minutes, about 20 minutes, about 25 minutes, about 30 minutes, about 35 minutes, about 45 minutes, about 1 hour, about 2 hours and about 3 hours. The debonding time of the adhesive may fall within one of many different ranges. In an embodiment, the debonding time range can be selected from the following ranges, about 1 minute to about 3 hours, about 1 minute to about 2 hours, about 1 minute to about 1 hour, about 5 minutes to about 1 hour, about 5 minutes to about 45 minutes, about 10 minutes to about 45 minutes, and about 15 minutes to about 30 minutes.

The fan case liner panel 32 can include a forward section 46 having a first thickness and a rearward section 48 having a greater second thickness, as shown in FIG. 2. In an embodiment, the forward section 46 and the rearward section 48 have the same thickness so that the fan case liner panel 32 has a uniform thickness. Illustratively, the adhesive layer 34 is located between the rearward section 48 and the fan case 16. The forward section 46 is formed to include an aperture 45 located between the fan case 16 and the forward section 46 so that no adhesive layer 34 is between the forward section 46 and the inner radial surface 30.

The fasteners 36 secure the fan case liner panel 32 to the fan case 16, as shown in FIG. 2. The forward section 46 and the rearward section 48 are formed to include apertures 47,49 configured to receive the fasteners 36. Illustratively, the fastener 36 is a bolt, however any fastener suitable for securing the fan case liner panel 32 to the fan case 16 can be used, such as a screw or a rivet. In another embodiment in accordance with the present disclosure, the fan case liner panel 32 does not include apertures 47,49 and is secured to the fan case 16 only with an adhesive layer.

A heat source 52 is used for heating the adhesive layer 34 to a debonding temperature, as shown in FIG. 2. The heat source 52 is configured to apply heat to the portion of the fan case 16 containing the fan case liner panel 32 to be removed. It should be understood that heat source 52 can be configured to apply heat to any number of fan track liner panels 32 so that multiple fan case liner panels 32 can be removed simultaneously. The heat source 52 is arranged along an outer radial surface 54 of the fan case 16. In an embodiment, the heat source 52 is a heating element. In another embodiment, the heat source 52 is a silicon heat mat. In yet another embodiment, the heat source 52 is a flexible silicon heat mat. Illustratively, in some embodiments the heat source can be a hot air blower or a radiant lamp. In one aspect, electricity can be applied to the heat source 52 to produce heat. The flexible silicon heating mat can be configured to match the area of the first fan case liner panel 32 requiring removal.

A method 100 of repairing the fan case liner 24 includes the step 110 of applying heat to a portion of the outer radial surface 54 of the fan case 16, the step 120 of removing the first fan case liner panel 32 from the inner radial surface 30 of the fan case 16, and the step 130 of bonding a second fan case liner panel 32 to the inner radial surface 30, as shown in FIGS. 5A-D and-6. In an embodiment, the method 100 further includes the step 140 of removing any edge filler or fastener filler from the fan case liner 24.

Illustratively, the step 110 of applying heat to a portion of the outer radial surface 54 includes a step 112 of arranging a heat source 52 along a portion of the outer radial surface 54 of the fan case 16 that overlies the fan case liner panel 32 to be removed, as shown in FIGS. 5A and 6. The step 110 of applying heat to the portion of the outer radial surface 54 can include a step 114 of connecting the heat source 52 to a power source to provide electricity to the heat source 52, as shown in FIG. 6. Illustratively, the heat source 52 is a flexible silicon heating mat and heats the fan case liner panel 32 to the debonding temperature for the debonding time of the adhesive layer 34. The step 110 of applying heat to a portion of the outer radial surface 54 can ease the removal of the first fan case liner panel 32 and prevent damage to the inner radial surface 30.

The annular outer shroud 22 of the fan case 16 comprises a temperature conductive material. In an embodiment, the annular outer shroud 22 comprises a composite material, or may comprise an alloy. During the step 110 of applying heat to the outer radial surface 54, the heat produced by the heat source 52 is conducted through the annular outer shroud 22 and increases the temperature of the adhesive layer 34 to the debonding temperature.

Illustratively, the step 120 of removing the first fan case liner panel includes the step 122 of manually removing the debonded, or first, fan case liner panel 32, as shown in FIGS. 5B and 6. The step 122 can include prying the first fan case liner panel 32. The step 120 of removing the first fan case liner panel can further include the step 124 of cleaning the adhesive residue from the fan case 16. The step 120 of removing the first fan case liner panel 32 can further include and the step 126 of cleaning and preparing the edges of the bonded fan case liner panels 32 located on the inner radial surface 30. Illustratively, the step 124 of cleaning the adhesive residue is performed with a scraper, or optionally, the step 124 of cleaning the adhesive residue is performed with a solvent. In yet another embodiment, the step 124 of cleaning the adhesive residue is performed with both a scraper and a solvent.

Illustratively, the step 130 of bonding a second fan case liner panel 32 to the inner radial surface 30 includes the step 132 of cleaning the inner radial surface 30 of the fan case 16 to yield an undisrupted inner surface and applying an unbonded adhesive layer 35, as shown in FIGS. 5C and 6. The step 130 of bonding a second fan case liner panel 32 to the inner radial surface 30 can further include the step 134 of securing a second fan case liner panel 32 with the unbonded adhesive layer 35 and the fasteners 36. Once contacted, the unbonded adhesive layer 35 bonds to the fan case liner panel 32 and forms an adhesive layer 34. The step 130 of bonding a second fan case liner panel 32 to the inner radial surface 30 can further include the step 136 of activating the heat source 52 to accelerate the cure time of the adhesive layer 34 and produce the repaired fan case liner 24, as shown in FIG. 5D.

In an embodiment, the method 100 of repairing the fan case liner 24 further includes the step 140 of preparing the first fan case liner panel 32 for debonding by removing and separating fastener and edge filler material, as shown in FIG. 6. After completion of step 140, the fasteners 36 and the fan case liner panel 32 are replaceable during steps 110, 120, and 130.

It is understood to one skilled in the art that method 100 can include each of the steps 110, 120, 130, and 140, or optionally only include a subset of steps 110, 120, 130, and 140 depending on the application. Furthermore, it is understood to one skilled in the art that each of the steps included in each of steps 110, 120, 130, and 140 may be omitted.

The present disclosure is a process whereby a heating element such as a silicon or similar flexible heating element, temporarily applies heat to the outside of a fan case 16. Heating the exterior of the fan case 16 heats the adhesive layer 34 of the liner by conduction to the point where the adhesive softens enough to remove the fan attrition liner or acoustic panel from the case. This may be accomplished without chiseling. Once the panel is removed, the residual adhesive may be removed with plastic or aluminum scrapers, abrasive pads and acetone, or a heat gun. This process simplifies panel removal while leaving a clean and undamaged fan case 16 surface to which a new liner may be applied. It is appreciated that for a titanium case, the adhesive softening temperature is well below any temperature that may adversely affect the titanium material or any other material of the fan case 16.

To remove the first fan case liner panel 32, one or more silicon heating mats are applied to the outer radial surface 54 of fan case 16 as shown in FIG. 2. It is appreciated that mats are located opposite interior surface of fan case 16 and from adhesive layer 34 and fan case liner 24. It is further appreciated that heat transfer, such as conduction through one side of fan case 16 to adhesive layer 34, may be made by any variety of means such as those previously discussed. Illustratively a polysulphide adhesive, a polythioether, or an adhesive film may be used herein. The adhesive may be heated to a temperature of about 150° C. to about 160° C.

With sufficient heat applied, the adhesive characteristics of adhesive layer 34 between fan case liner 24 and fan case 16 are destroyed. This allows the fan case liner panel 32 to be removed exposing inner radial surface 30, as shown in FIG. 5B. A pry bar may be used to remove the liner or panel. It is appreciated that less effort is required to pry the liner or panel off since it was heated. With the liner or panel removed, any residual adhesive on fan case 16 where the liner once was may be removed from inner radial surface 30 by a scraper. Once that is complete, fan case 16 may be reconditioned and readied to receive a second fan case liner panel 32, as shown in FIG. 5C. Alternatively, the removal process may be repeated for any additional liners or panels on the case that need replacing.

This process may be implemented on the front or rear of any fan case 16 where there is access to its exterior opposite the liner or panel to be removed. Where the liner or panel is bonded with an adhesive and the case material is sufficiently conductive to transfer adequate heat to the adhesive, it will soften. It is contemplated that any meltable or thermoplastic-like bonding panel liner to the fan case may be removed with this method including acoustic panels, fan case liners, and fillers.

In another aspect of the present disclosure, the methods described herein can apply to acoustic panels. Illustratively, an acoustic panel can be coupled to a surface with an adhesive. A method to replace the acoustic panel can comprise arranging a heating element along an exterior portion of an acoustic case that overlies the acoustic panel that needs to be replaced, heating the acoustic case to a debonding temperature, prying the acoustic.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A method of replacing a fan case liner in a fan case, the method comprising
    applying heat to a portion of an exterior surface of a fan case to soften an adhesive layer bonding a first fan case liner panel to an inner surface of the fan case,
    removing the first fan case liner panel and adhesive residue from the fan case to produce an undisrupted inner surface of the fan case, and
    bonding a second fan case liner panel to the undisrupted inner surface of the fan case, wherein
    applying heat to the portion of the exterior of the fan case is performed on the portion of the fan case containing the first fan case liner panel.

2. The method of claim 1, wherein applying heat to the portion of the exterior of the fan case includes arranging a heating element along the exterior surface of the fan case and providing electricity to the heating element to heat the adhesive layer to a debonding temperature.

3. The method of claim 2, wherein the heating element comprises a flexible silicon heating mat.

4. The method of claim 2, wherein the portion of the exterior surface of the fan case overlies the first fan case liner panel.

5. The method of claim 2, wherein the debonding temperature is about 150° C. to about 160° C.

6. The method of claim 5, wherein the fan case is held at the debonding temperature for about five minutes to about one hour.

7. The method of claim 1, wherein removing the first fan case liner panel includes prying the first fan case liner panel from the fan case.

8. The method of claim 7, wherein removing the adhesive residue includes applying a solvent and manually removing the adhesive residue.

9. The method of claim 8, wherein manually removing the adhesive residue from the inner surface of the fan case is performed with a scraper.

10. The method of claim 1, wherein bonding the second fan case liner panel includes applying an unbonded adhesive layer to the undisrupted inner surface of the fan case and bonding the second fan case liner panel to the unbonded adhesive layer and the undisrupted inner surface.

11. The method of claim 10, further including heating the exterior surface of the fan case to bond the second fan case liner panel to the fan case.

12. The method of claim 1, further including removing edge fillers prior to applying heat to the exterior surface of the fan case.

13. The method of claim 1, wherein the first fan case liner panel includes a bonding layer, a surface layer, and a core layer arranged to extend between and interconnect the bonding layer and the surface layer.

14. The method of claim 13, wherein the adhesive layer is located between the bonding layer of the first fan case liner panel and the inner surface of the fan case.

15. The method of claim 14, wherein the adhesive layer comprises a polysulphide adhesive.

16. The method of claim 14, wherein the adhesive layer comprises a polythioether adhesive.

17. The method of claim 13, wherein the fan case includes a plurality of fan case liner panels arranged in a ring along the inner surface of the fan case to circumferentially surround a fan included in a gas turbine engine.

18. A method of replacing a fan case liner in a fan case, the method comprising applying heat to an exterior surface of a fan case to soften an adhesive bonding a first fan case liner panel to an inner surface of the fan case, removing the first fan case liner panel and adhesive residue from the fan case to produce an undisrupted surface of the fan case, and bonding a second fan case liner panel to the undisrupted surface of the fan case, wherein, applying heat to the exterior of the fan case is performed on a portion of the fan case containing the first fan case liner panel, the first fan case liner panel includes a bonding layer, a surface layer, a core layer arranged to extend between and interconnect the bonding layer and the surface layer, and an adhesive layer located between the bonding layer of the first fan case liner panel and the inner surface of the fan case.

19. A replaceable fan case liner system for a turbine engine comprising, a ring-shaped fan case arranged to circumferentially surround a fan, a heat source arranged to extend along an exterior surface of the ring-shaped fan case, and a fan case liner system configured to extend around an inner surface of the ring-shaped fan case between the fan and the ring-shaped fan case, wherein the fan case liner system includes a fan case liner panel coupled to the ring-shaped fan case that forms a continuous ring on the inner surface of the ring-shaped fan case and the fan case liner panel is configured to bond to the inner surface of the ring-shaped fan case.

20. The fan case liner system of claim 19, wherein the fan case liner system further includes an adhesive layer located between the fan case liner panel and the inner surface of the ring-shaped fan case.

\* \* \* \* \*